(12) United States Patent
Elias et al.

(10) Patent No.: US 9,571,473 B2
(45) Date of Patent: Feb. 14, 2017

(54) EARLY CONTENT ENGINE RECEIVER SYNCHRONIZATION

(71) Applicant: Synopsys, Inc., Mountain View, CA (US)

(72) Inventors: Andrew A. Elias, Ottawa (CA); A.A. Jithra Adikari, Ottawa (CA)

(73) Assignee: Synopsys, Inc., Mountain View, CA (US)

(*) Notice: Subject to any disclaimer, the term of this patent is extended or adjusted under 35 U.S.C. 154(b) by 53 days.

(21) Appl. No.: 14/252,320

(22) Filed: Apr. 14, 2014

(65) Prior Publication Data

US 2015/0295904 A1  Oct. 15, 2015

(51) Int. Cl.
| | |
|---|---|
| H04L 29/06 | (2006.01) |
| H04N 21/2347 | (2011.01) |
| H04N 1/32 | (2006.01) |
| H04N 21/4367 | (2011.01) |

(52) U.S. Cl.
CPC ....... H04L 63/0457 (2013.01); H04L 63/0428 (2013.01); H04N 1/32443 (2013.01); H04N 21/2347 (2013.01); H04N 21/4367 (2013.01); H04L 63/061 (2013.01); H04L 2209/60 (2013.01)

(58) Field of Classification Search
CPC ............ H04L 2209/60; H04N 21/2347; H04N 21/4367; H04N 1/32443
See application file for complete search history.

(56) References Cited

U.S. PATENT DOCUMENTS

| | | | |
|---|---|---|---|
| 8,374,346 B2 | 2/2013 | Choi et al. | |
| 2003/0188188 A1* | 10/2003 | Padmanabhan et al. | 713/201 |
| 2007/0064941 A1* | 3/2007 | Unger et al. | 380/210 |
| 2009/0296938 A1* | 12/2009 | Devanand et al. | 380/278 |
| 2010/0220977 A1* | 9/2010 | Kwon | G11B 20/00086 386/252 |
| 2012/0210385 A1* | 8/2012 | Cirstea | H04N 7/102 725/127 |

(Continued)

OTHER PUBLICATIONS

Xiong et al., "Research and Design of Data Transmission System Based on HDMI", 2013, pp. 348-351.*

(Continued)

*Primary Examiner* — Kenneth Chang
*Assistant Examiner* — Thaddeus Plecha
(74) *Attorney, Agent, or Firm* — Jaquez Land Greenhaus LLP; Bruce Greenhaus, Esq.

(57) ABSTRACT

An HDCP receiver device that receives frames from an HDCP transmitter device. The receiver device has a frame counter that is updated for each frame that is received from the transmitter device and that includes encrypted content, while the receiver device is in a pre-authorization mode. During the pre-authorization mode, the receiver device does not decrypt any received frame bearing encrypted content. While the receiver device waits to transition from the pre-authorization mode to a post-authorization mode in which the receiver device can begin to decrypt any received frames that include encrypted content, the frame counter is updated for each frame received that includes encrypted content. In the post-authorization mode, the frame counter has a nonzero value if frames including encrypted content were received by the receiver device during the pre-authorization mode.

6 Claims, 3 Drawing Sheets

(56) References Cited

U.S. PATENT DOCUMENTS

| | | | |
|---|---|---|---|
| 2013/0230296 A1 | 9/2013 | Yun et al. | |
| 2014/0067686 A1* | 3/2014 | Tuttle | G06Q 30/06 |
| | | | 705/51 |
| 2015/0063187 A1* | 3/2015 | Lin et al. | 370/312 |
| 2015/0215058 A1* | 7/2015 | Yi | G09G 5/006 |
| | | | 370/350 |

OTHER PUBLICATIONS

International Search Report and Written Opinion in corresponding International Application No. PCT/IB2014/060718, mailed Oct. 20, 2014 (7 pages).

\* cited by examiner

FIG. 1 – Prior art

EARLY CONTENT ENGINE RECEIVER SYNCHRONIZATION

FIELD OF THE INVENTION

The present disclosure relates to the field of synchronisation of a content encryption engine for HDCP over HDMI.

BACKGROUND OF THE INVENTION

Revision 2.2 of the specification for High-bandwidth Digital Content Protection (HDCP) on High-Definition Multimedia Interface (HDMI) was released on February 2013. When setting up an HDCP HDMI transfer, a session key exchange (SKE) is performed.

An HDCP system is composed of a source device, one or more sink devices and/or one or more repeater devices. A source device is an HDCP transmitter that encrypts the video/audio content according to the HDCP HDMI Revision 2.2 specification. A sink device is an HDCP receiver that decrypts the video/audio content according to the specification. A repeater device is an HDCP repeater that can decrypt and re-encrypt the video/audio content according the specification. In this document, we will only consider the HDCP transmitter and HDCP receiver but the same rationale can be applied to HDCP repeaters.

At the end of the pre-authorization stage, the HDCP transmitter will generate session information and pass this to the HDCP receiver. This information, along with the initial values outlined in the HDCP HDMI Revision 2.2 specification, are programmed into the content encryption engine prior to the transmission and receiving of the content data. This moves the HDCP system to the post-authorization stage which must maintain cipher synchronization in order to avoid link integrity problems. Cipher synchronization is achieved when both devices maintain the same frame counter value. The counter value starts at 0 and is incremented for every encrypted (protected) frame. This value is used for AES in counter mode. The HDCP receiver maintains this count by counting each encrypted frame.

The HDCP HDMI Revision 2.2 specification states that the HDCP transmitter must wait 200 ms after session key exchange (SKE) before transmitting the encrypted content. This minimizes issues related to the cipher synchronization on the HDCP receiver. In some cases, the HDCP transmitter may not be compliant to the HDCP HDMI Revision 2.2. specification and begin transmission of protected content immediately after SKE and/or less than the stated 200 ms. This may result with the HDCP receiver not able to properly synchronise with the HDCP transmitter therefore causing link integrity problems.

Referring to FIG. 1, a transmitter (Tx) sends three frames 101a-101c with no encryption (ENC_DIS). Once the receiver (Rx) 100 programs the encryption keys and reaches the AUTH (authorization) mode 103, the receiver 100 begins to monitor the frame content for ENC_EN control signal 102c-102e. When the control signal is received after the receiver 100 transitions to the AUTH mode, the receiver 100 begins to perform a frame count 104. Maintaining a proper frame count is essential to ensure proper cipher synchronization.

If the transmitter does not wait 200 ms after sending the encrypted session key but rather begins to send encrypted content immediately before, during or after the SKE (session key exchange), the receiver 100 may not be ready or prepared for listening to the ENC_EN=1 control signal, and the receiver 100 may not synchronize the cipher and therefore cannot decrypt the content data. FIG. 1 illustrates this scenario, when the transmitter (Tx) starts sending encrypted content starting at Frame #3 102a, but the switch to authorization mode 103 does not occur until after Frame #4. Accordingly, the receiver (Rx) 100 does not initialize the frame counter until after Frame #5 is received.

There is a need to guarantee correct cipher synchronization even if the transmitter sends encrypted content prior to the 200 ms delay required by the HDCP HDMI 2.2 specification.

SUMMARY OF THE INVENTION

According to an aspect of the present disclosure, a method includes: receiving, at a receiver device, frames from a transmitter device; and in response to receiving frames including encrypted content, the receiver device updating its internal state while the receiver device is in a pre-authorization mode or prior to completion of a session key exchange between the receiver device and the transmitter device. In the pre-authorization mode, the receiver device awaits authorization to decrypt any received frames that include encrypted content.

The internal state can be a frame counter that begins to count the number of frames received by the receiver device as soon an encryption enable control signal is detected in one of the received frames. The method can further include incrementing the frame counter by a Content Encryption Engine (CEE) of the receiver device. The CEE can output a temporary image while encryption keys associated with the session key exchange are fully programmed by the receiver device. At the start of a post-authorization mode following the pre-authorization mode, the frame counter can have a non-zero value.

The internal state can be an Advanced Encryption Standard engine running in counter mode that increments a counter value each time the receiver device receives a frame that includes encrypted content. The receiver device can receive the frames from the transmitter device according to the High-bandwidth Digital Content Protection (HDCP) on High-Definition Multimedia Interface (HDMI) 2.2 specification.

The receiver device can be configured to not update any internal state until a frame including encrypted content is received by the receiver device. Proper cipher synchronization can be guaranteed regardless of when the transmitter device begins to send frames including encrypted content.

According to another aspect of the present disclosure, a receiver device is disclosed that receives frames from a transmitter device. The receiver device includes a frame counter that is updated for each frame that is received from the transmitter device and that includes encrypted content. While the receiver device is in a pre-authorization mode in which the receiver device does not decrypt any received frame that includes encrypted content and while the receiver device is waiting to transition from the pre-authorization mode to a post-authorization mode in which the receiver device can begin to decrypt any received frames that include encrypted content, such that in the post-authorization mode, the frame counter has a nonzero value if frames including encrypted content were received by the receiver device during the pre-authorization mode.

BRIEF DESCRIPTION OF THE DRAWINGS

Exemplary embodiments of the invention will now be described in conjunction with the following drawings, in which.

DETAILED DESCRIPTION THE INVENTION

Figure 2:
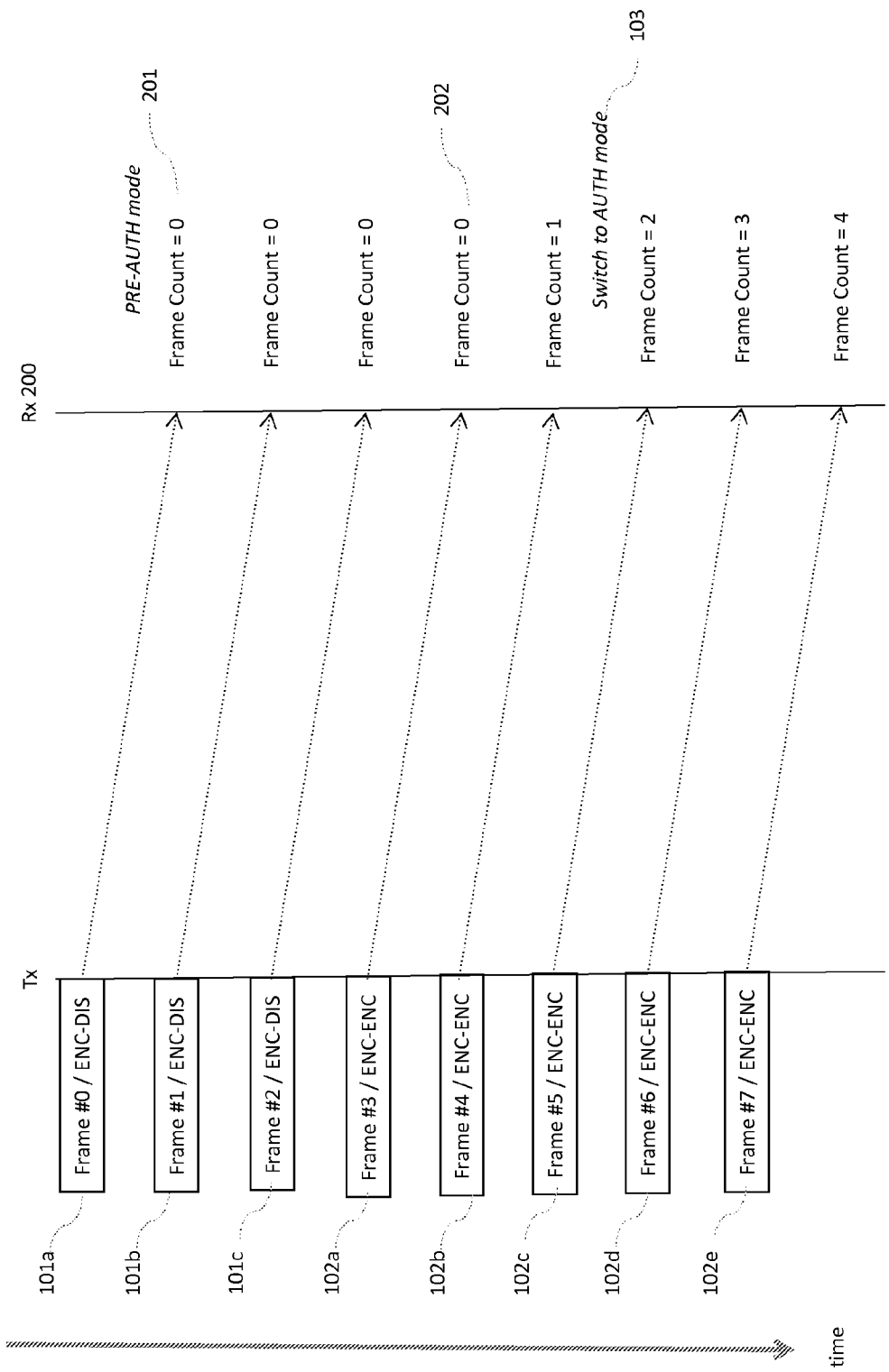
FIG. 2 illustrates a receiver updating the frame count after detection of an encrypted frame independent of the authentication process.

Referring to FIG. 2, in an embodiment, in order to ensure proper cipher synchronization, the receiver 200 starts the frame count 201 prior to the SKE being established (or in a pre-authorization or PRE-AUTH state) as soon as an ENC-EN control signal 102a is detected. The SKE exchange occurs when the transmitter (Tx) sends an encrypted session key to the receiver (Rx). An example of a session key is a random, secret cryptographic key negotiated between the HDCP transmitter (Tx) and the HDCP receiver (Rx) 200 during session key exchange (SKE) and used during HDCP content encryption or decryption. HDCP content includes audiovisual content (including in encrypted form) that is protected by the HDCP system and transferred from the HDCP transmitter to a downstream sink device (e.g. an HDCP receiver 200) over an HDCP-protected interface, such as HDMI. A scenario of an HDCP system includes the HDCP transmitter (Tx) and HDCP receiver (Rx) 200 shown in FIG. 2. The HDCP receiver (Rx) 200 is a device that can receive and decrypt encrypted content through one or more HDCP-protected interface ports (such as an HDMI port). The HDCP transmitter (Tx) is a device that can encrypt and transmit HDCP content through one or more of its HDCP-protected interface ports (such as an HDMI port).

The ENC-EN or ENC-ENC control signal is referred to as an encryption enable control signal, and indicates the presence of encrypted content within a frame. In FIG. 2, ENC-ENC refers to the enablement of the ENC control signal and the presence of encrypted content in the frame (the terms ENC-EN and ENC-ENC are identical and used interchangeably herein). The ENC-DIS control signal is referred to as an encryption disabled control signal, and indicates the absence of encrypted content within a frame. The pre-authorization or PRE-AUTH mode refers to a state of the receiver 200 before the SKE has been established. Once the SKE has been established, the receiver 200 transitions to the authorization or AUTH mode, indicating that the receiver 200 can receive encrypted HDCP content. For example, during the PRE-AUTH mode, the Authentication and Key Exchange (AKE) and the Locality Check occur, as defined in the HDCP HDMI 2.2 specification. During the AKE exchange, the HDCP transmitter verifies the HDCP receiver's public key certificate, and a Master Key is exchanged between the HDCP transmitter and receiver. During the Locality Check, the HDCP transmitter enforces locality on the content by requiring that the round trip time between a pair of messages is not more than 20 ms. The frame count refers to an integer number that indicates the number of encrypted frames received since the start of HDCP encryption. For example, according to the HDCP HDMI 2.2 specification, the frame count can correspond to FrameNumber or inputCtr. At the end of the authentication protocol, a communication path is established between the transmitter (Tx) and the receiver (Rx) 200 in the AUTH mode for communication of encrypted content.

Figure 1:
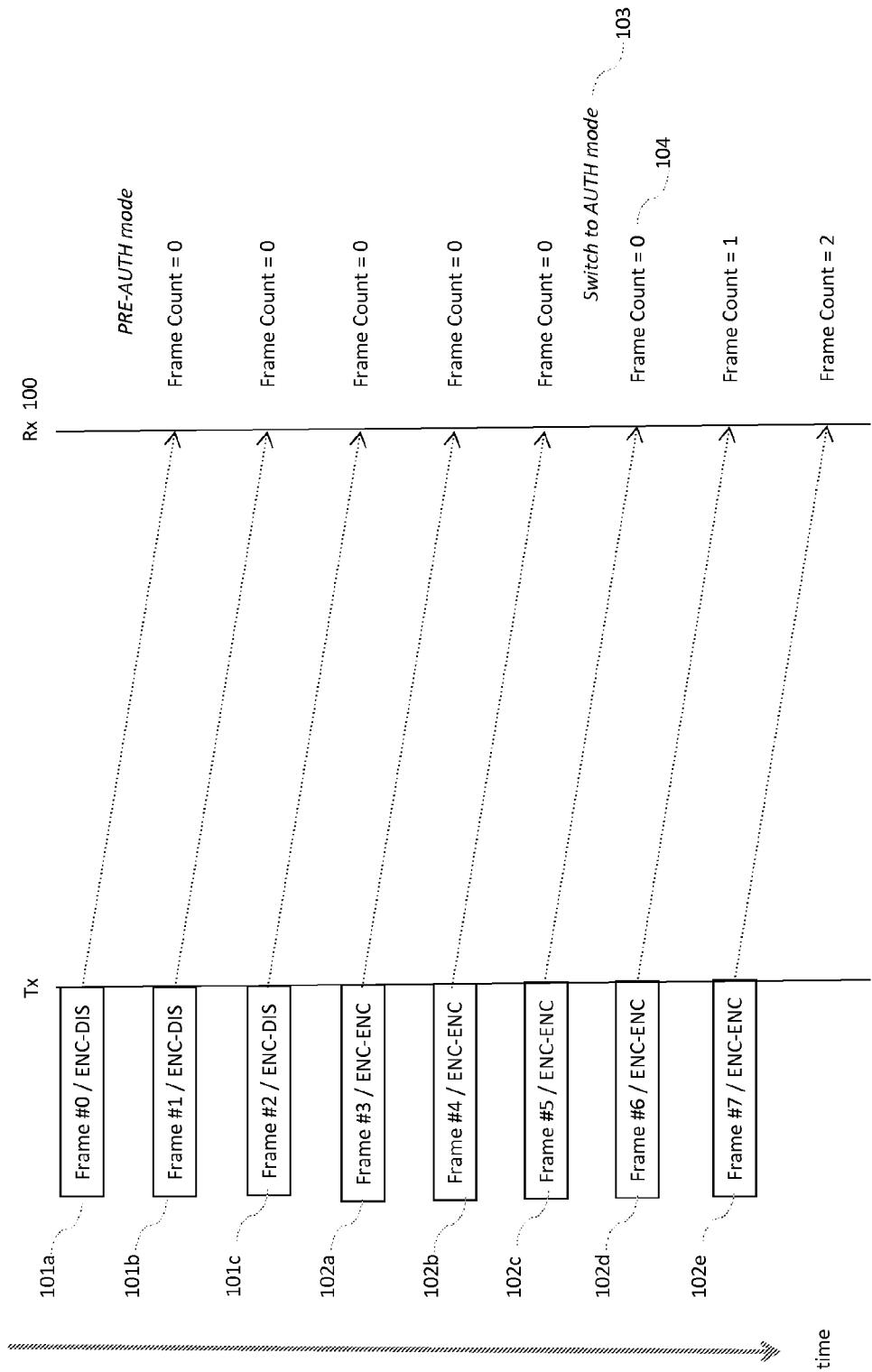
FIG. 1 illustrates a receiver that updates the encrypted frame count after authentication is completed and after the transmitter has already begun to send encrypted content.

Conventionally and prior to the aspects disclosed in the present disclosure, the frame count or inputCtr is initialized to zero when HDCP encryption is enabled for the first time at the first encryption enable (ENC_EN) immediately after SKE (see FIG. 1). However, according to the present disclosure, the frame count is initialized and incremented in parallel with the HDCP encryption set up. If the transmitter (Tx) sends encrypted content (as indicated by the presence of the ENC_ENC control signal with the frame) prior to the 200 ms delay, but immediately before, during or after the SKE, the cipher synchronisation can still be achieved because the receiver (Rx) 200 is already counting the frames. This implementation is compliant to the HDCP HDMI 2.2 standard.

When the first ENC_EN (or ENC-ENC) control signal is detected by the receiver 200, a Content Encryption Engine (CEE) of the receiver 200 starts the frame count from zero (202) and increments by one each time the receiver detects another ENC_EN frame. The CEE of the receiver 200 also decrypts the encrypted content received from the transmitter (Tx).

In the example of FIG. 2, the receiver 200 receives the first ENC-ENC control signal with Frame #3 (102a), and initializes the frame count to zero (202). The frame count is incremented by one when Frame #4 is received along with another ENC-ENC control signal indicating the presence of encrypted content. In this example, the transmitter (Tx) has already started to send encrypted content during the PRE-AUTH mode and before the SKE has been established. Thus, the frames are already being counted by the CEE as soon as the transmitter (Tx) begins sending encrypted content, even though SKE has not been established or while the receiver is still performing its pre-authorization actions in the PRE-AUTH mode.

If the encryption keys are not fully programmed into the CEE of the receiver 200 before the frame count starts to increase, the CEE can optionally output a temporary image while the encryption keys are being fully programmed, at which point decryption can take place at the next vertical sync (VSYNC).

Figure 3:
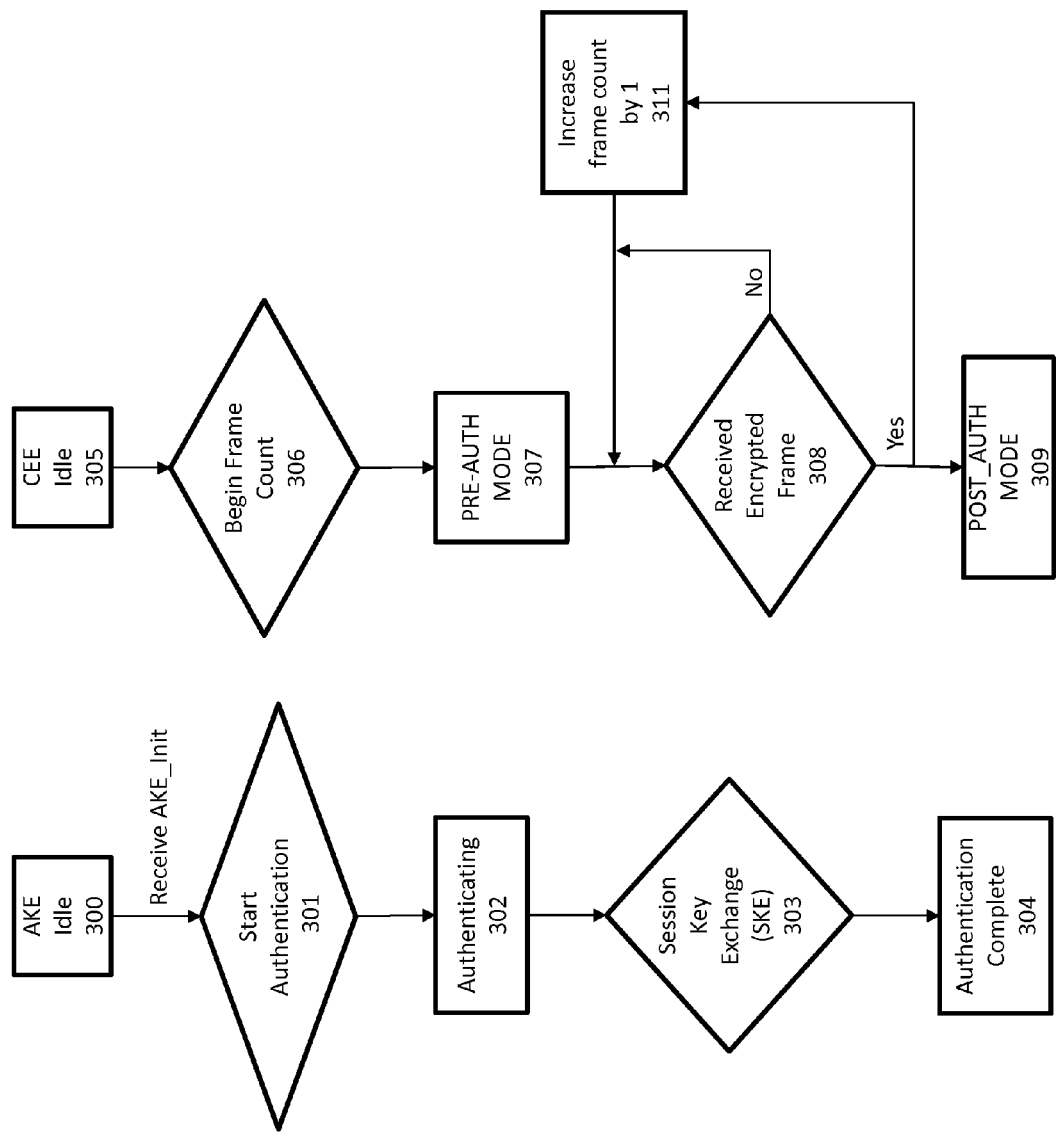
FIG. 3 illustrates exemplary functions of the AKE and CEE.

Referring to FIG. 3, the Authentication Key Engine (AKE) 300, while in an idle mode, receives an authentication intiation signal, AKE Init, starts authentication (301), and moves to an Authenticating state (302), while at the same time the CEE moves from an idle mode (305) into the PRE-AUTH mode (307). The SKE is then performed (303), and the CEE of the receiver 200 starts receiving encrypted frames from the transmittier Tx (308). When the authentication is complete (304) in the AKE 300, the CEE also moves to a POST_AUTH mode (309). In this embodiment, the CEE begins the frame count immediately (306) when moving into the PRE_AUTH mode (307), and when an encrypted frame is received (308), the CEE increases the frame count by 1 (311).

Early detection of encrypted frames is performed in order to maintain proper cipher synchronization. Other HDCP devices do not require counting frames, but require maintaining other states properly before the encryption keys are set up. For another example of a state, a counter is maintained by the AES (Advanced Encryption Standard) encryption state machine in the receiver 200. This counter (instead of a frame counter) can be updated prior to establishing the SKE, and therefore maintains cipher synchronization.

In this embodiment, the content protection algorithm starts updating the states (e.g., frame counter or AES counter) for each encrypted frame received before reaching the POST_AUTH mode. Once the key exchange is completed and the CEE reaches POST_AUTH mode, the state of the engine is already up to date and ready to decrypt incoming data.

Advantageously, the embodiments described above operate within existing standards to provide improved power performance for portable and battery operated devices. Though the invention is described with reference to transceivers, it is equally applicable to receivers, transmitters, repeaters and to cryptographic engines.

FIGS. 2-3, described by way of example above, represent one or more algorithms that correspond to at least some instructions executed by the one or more controller devices or computers to perform the above described functions, acts, or steps. Any of the methods or algorithms or functions described herein can include non-transitory machine or computer-readable instructions for execution by: (a) a processor, (b) a controller, and/or (c) any other suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.).

While particular aspects and implementations of the present disclosure have been illustrated and described, it is to be understood that the present disclosure is not limited to the precise construction and compositions disclosed herein and that various modifications, changes, and variations are not only contemplated but also apparent from the foregoing descriptions without departing from the scope of the present disclosure as defined in the appended claims.

What is claimed is:

1. A hardware receiver device operating in a pre-authorization mode and a post-authorization mode, the receiver device comprising:
   an interface port that receives frames from a transmitter device;
   a content encryption engine (CEE) having an output port; and
   a frame counter having a frame counter value and an input port coupled to receive a control signal from the output port of the CEE, the control signal indicating the presence of encrypted content within the received frames, the frame counter value being incremented by the CEE for each of the frames received during the pre-authorization mode from the transmitter device that include the encrypted content, such that in the post-authorization mode, the frame counter value is nonzero if the frames received during the pre-authorization mode included the encrypted content;
   wherein the receiver device does not decrypt the received frames in the pre-authorization mode while waiting to transition from the pre-authorization mode to the post-authorization mode, wherein the pre-authorization mode is a state of the receiver device before a session key exchange has been completed with the transmitter device and the post-authorization mode is a state of the receiver after the session key exchange has been completed, and
   wherein the receiver device uses the frame counter value to synchronize decrypting of the encrypted content.

2. The receiver device of claim 1, wherein:
   the CEE waits for completion of the session key exchange before decrypting the received frames that include the encrypted content.

3. The receiver device of claim 1, wherein the CEE outputs a temporary image while encryption keys associated with the session key exchange are being programmed.

4. The receiver device of claim 1, wherein the frame counter is implemented by an Advanced Encryption Standard engine running in counter mode that increments the counter value each time one of the received frames includes encrypted content.

5. The receiver device of claim 1, wherein the receiver device receives the frames from the transmitter device according to the High-bandwidth Digital Content Protection (HDCP) on High Definition Multimedia Interface (HDMI) 2.2 specification.

6. The receiver device of claim 1, wherein the frame counter does not begin incrementing until a frame, from among the received frames, includes the encrypted content received.

* * * * *